(12) United States Patent
Wang

(10) Patent No.: US 11,064,040 B2
(45) Date of Patent: Jul. 13, 2021

(54) INFORMATION PUSH METHOD, READABLE MEDIUM, AND ELECTRONIC DEVICE

(71) Applicant: Tencent Technology (Shenzhen) Company Limited, Shenzhen (CN)

(72) Inventor: Xingya Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/510,711

(22) Filed: Jul. 12, 2019

(65) Prior Publication Data

US 2019/0342414 A1 Nov. 7, 2019

Related U.S. Application Data

(63) Continuation of application No. PCT/CN2018/082511, filed on Apr. 10, 2018.

(30) Foreign Application Priority Data

Apr. 10, 2017 (CN) .......................... 201710228314.0

(51) Int. Cl.
H04L 29/08 (2006.01)
G06F 16/9035 (2019.01)

(52) U.S. Cl.
CPC .......... *H04L 67/26* (2013.01); *G06F 16/9035* (2019.01); *H04L 67/306* (2013.01)

(58) Field of Classification Search
CPC .... H04L 67/26; H04L 67/306; G06F 16/9035
See application file for complete search history.

(56) References Cited

U.S. PATENT DOCUMENTS

2009/0083796 A1  3/2009  Karasudani et al.
2014/0280214 A1* 9/2014  Han ..................... G06F 16/9535
                                                      707/748

(Continued)

FOREIGN PATENT DOCUMENTS

CN  102054003 A  5/2011
CN  105975483 A  9/2016
CN  105989005 A  10/2016

OTHER PUBLICATIONS

Tencent Technology, WO, PCT/CN2018/082511, Jun. 21, 2018, 4 pgs.

(Continued)

*Primary Examiner* — Caroline H Jahnige
(74) *Attorney, Agent, or Firm* — Morgan, Lewis & Bockius LLP

(57) ABSTRACT

Embodiments of this application provide an information push method performed at a computing device. The computing device determines second feature information of a target object associated with a terminal that is communicatively connected to the computing device according to user-behavioral data of the target object and first feature information of to-be-pushed information, and then user-preference level information according to the second feature information of the target object and the first feature information of the to-be-pushed information. The computing device then orders the to-be-pushed information according to the user-preference level information into target information. Finally, the computing device pushes the target information to the target object. Therefore, according to the technical solutions provided in the embodiments of this application, a coverage range of information can be expanded to some extent, thereby improving the preciseness of information pushing.

14 Claims, 6 Drawing Sheets

(56) References Cited

U.S. PATENT DOCUMENTS

2018/0053210 A1\* 2/2018 Modarresi .......... G06Q 30/0251
2018/0063276 A1\* 3/2018 Foged .................... H04W 4/80

OTHER PUBLICATIONS

Tencent Technology, IPRP, PCT/CN2018/082511, Oct. 15, 2019, 5 pgs.
Tencent Technology, ISR, PCT/CN2018/082511, Jun. 21, 2018, 2 pgs.

\* cited by examiner

INFORMATION PUSH METHOD, READABLE MEDIUM, AND ELECTRONIC DEVICE

CROSS-REFERENCE TO RELATED APPLICATIONS

This application is a continuation application of PCT/CN2018/082511, entitled "METHOD FOR PUSHING INFORMATION, READABLE MEDIUM AND ELECTRONIC DEVICE" filed on Apr. 10, 2018, which claims priority to Chinese Patent Application No. 201710228314.0, filed on Apr. 10, 2017 and entitled "INFORMATION PUSH METHOD, APPARATUS, READABLE MEDIUM", all of which are incorporated by reference in their entirety.

FIELD OF THE TECHNOLOGY

This application relates to the field of computer technologies, and in particular, to an information push method, a readable medium, and an electronic device.

BACKGROUND OF THE DISCLOSURE

As the information era approaches, people's life is glutted with various types of information. Currently, service providers usually push information to users accordingly, and existing information push methods are mainly popularity-based pushing or interest-type-based pushing. Popularity-based pushing is ranking current information according to statistics such as attention degree, a quantity of good comments, attention amount, and the like of target objects on the current information, to rank popular and high-quality information at a prior push position. Interest-type-based pushing is obtaining, according to a browsing and use history of various types of information of a target object, a type of information in which the target object is interested, to preferentially push the information.

However, during popularity-based recommendation, the same information is pushed to all target objects according to entire popularity, and user-specific pushing cannot be performed for a target object. A coverage range of information pushed according to an interest type is limited because the information pushing is affected by an information loss in a type system. It can be learned from this that a coverage range of information in the existing information push method is relatively small, and the preciseness of the information pushing is relatively low.

SUMMARY

In view of this, embodiments of this application provide an information push method, a readable medium, and an electronic device, to expand a coverage range of information to some extent, thereby improving the preciseness of information pushing.

According to a first aspect, an embodiment of this application provides an information push method performed at a computing device having one or more processors and memory storing a plurality of programs to be executed by the one or more processors, the method comprising:

determining second feature information of a target object associated with a terminal that is communicatively connected to the computing device according to user-behavioral data of the target object and first feature information of to-be-pushed information;

determining user-preference level information according to the second feature information of the target object and the first feature information of the to-be-pushed information;

ordering the to-be-pushed information according to the user-preference level information into target information; and pushing the target information to the target object.

According to a second aspect, an embodiment of this application provides a computing device having one or more processors, a storage apparatus coupled to the one or more processors, and one or more programs in the storage apparatus. The one or more programs, when executed by the one or more processors, cause the computing device to perform the aforementioned information push method.

According to a third aspect, an embodiment of this application provides an non-transitory computer readable storage medium storing a plurality of machine readable instructions in connection with a server having one or more processors. The plurality of machine readable instructions, when executed by the one or more processors, cause the server to perform the aforementioned information push method.

One of the foregoing technical solutions has the following beneficial effects:

In the embodiments of this application, the user-behavioral data of the target object is analyzed, the user-behavioral data of the target object is directly from the target object, and the second feature information of the target object obtained according to this can represent the feature of the information that is more favored by the target object. Therefore, based on the relationship between the second feature information of the target object and the to-be-pushed information, target information that is more favored by the target object can be selected accordingly. Compared with an existing information push method, the technical solutions provided in the embodiments of this application consider the second feature information of the target object, so that a problem of an information loss in an existing type system can be avoided. In addition, information in which each target object is interested can be pushed to the target object more accordingly, thereby preventing, to some extent, information in which the target object is not interested from being pushed to the target object. Moreover, compared with a manner in the existing technology in which the target information is determined only by analyzing history data of the target object, the technical solutions provided in the embodiments of this application are not limited by a history behavior of the target object. Therefore, relatively accurate information can be pushed to any target object, and a coverage range of the information is wider.

Other aspects and advantages of this application will be given in the following description, some of which will become apparent from the following description or may be learned from practices of this application.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
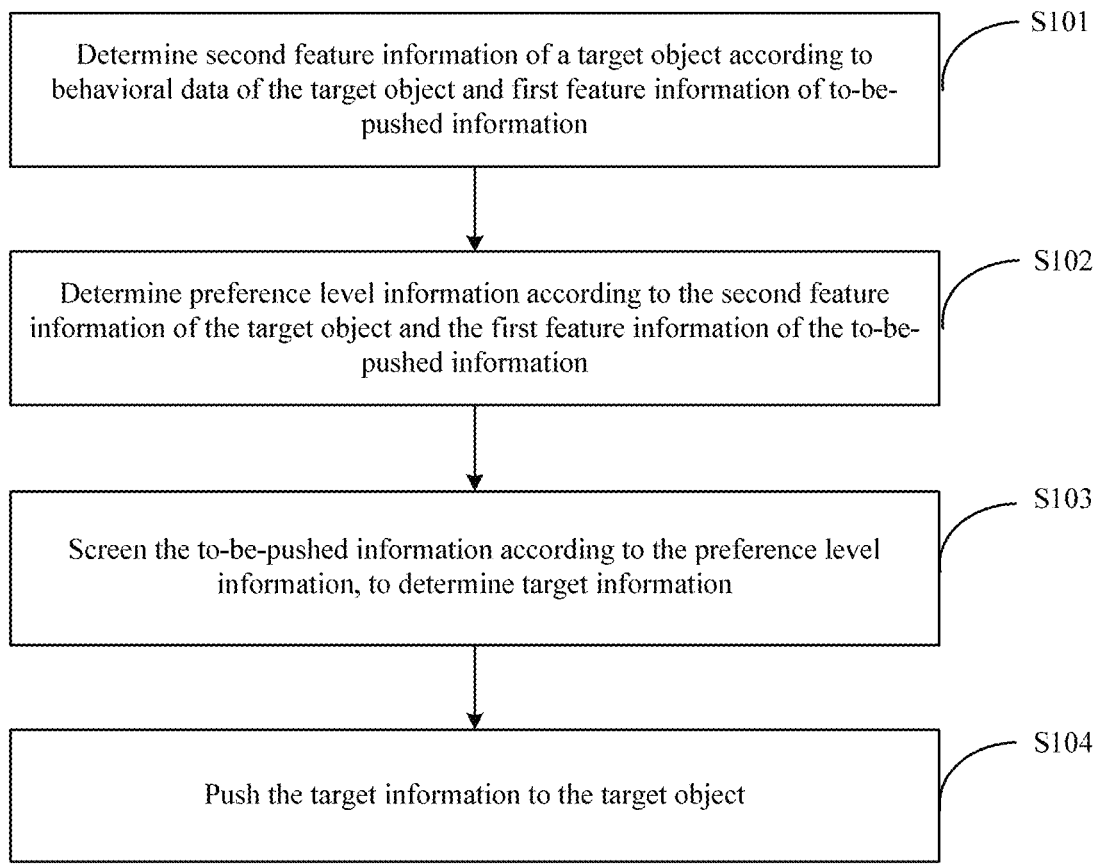
FIG. 1 is a schematic flowchart of an embodiment of an information push method according to an embodiment of this application.

To better understand the technical solutions of this application, the embodiments of this application are described below in detail with reference to the accompanying drawings.

It should be clear that the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely for describing specific embodiments, but are not intended to limit this application. The terms "a", "said" and "the" of singular forms used in the embodiments and the appended claims of this application are also intended to include plural forms, unless otherwise specified in the context clearly.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, although terms such as first, second, and third may be used to describe user-preference level information and the like in the embodiments of this application, the user-preference level information should not be limited to the terms. These terms are only used to distinguish the user-preference level information from each other. For example, without departing from the range of the embodiments of this application, first user-preference level information may be referred to as second user-preference level information, and similarly, second user-preference level information may be referred to as first user-preference level information.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

It should be noted that nouns of locality such as "above", "below", "left", and "right" described in the embodiments of this application are described from the perspective shown in the accompanying drawings, and should not be construed as a limitation to the embodiments of this application. In addition, in the context, it should be further understood that, when it is mentioned that one element is formed "above" or "below" another element, the element not only can be directly formed "above" or "below" the another element, but also can be indirectly formed "above" or "below" the another element by using an intermediate element.

To resolve a problem in the existing technology that a coverage range of information is relatively small and the preciseness of the information pushing is relatively low, the embodiments of this application provide the following idea: analyzing user-behavioral data of a target object, to obtain feature information of the object; and then, determining target information according to second feature information of the target object and first feature information of to-be-pushed information, and pushing the target information.

Under the guidance of the idea, the embodiments of this solution provide the following feasible implementation solutions.

An embodiment of this application provides an information push method.

Specifically, FIG. 1 is a schematic flowchart of an embodiment of an information push method performed at a computing device (e.g., a server) according to an embodiment of this application. As shown in FIG. 1, the method includes the following steps:

S101. Determine second feature information of a target object associated with a terminal that is communicatively connected to the computing device according to user-behavioral data of the target object and first feature information of to-be-pushed information.

Specifically, in this embodiment of this application, the user-behavioral data of the target object may include but is not limited to at least one of: user-behavioral data on an information platform of the object and provided by a service provider, user-behavioral data of the target object on each information, user-behavioral data on a communication platform related to the to-be-pushed information and user-behavioral data of a candidate object related to the target object.

For example, when the to-be-pushed information is game information, user-behavioral data on an information platform of the object and provided by a service provider may include but is not limited to: game clicking data, download data, registration data, welfare receiving data, shared data, and the like of the object on a game platform; user-behavioral data of the target object on information may include but is not limited to: a game duration, a game level, a consumption amount, a quantity of battling times, a winning rate, a quantity of running times, and the like of the object in each game; user-behavioral data on a communication platform related to the to-be-pushed information may include but is not limited to: posted data, reading data, searching data, and the like of the object on a communication platform such as a game forum; and user-behavioral data of a candidate object related to the target object may include but is not limited to: the foregoing user-behavioral data of a friend related to the object, and the like.

Alternatively, for another example, when the to-be-pushed information is video information, user-behavioral data on an information platform of the object and provided by a service provider may include but is not limited to: video watching data, purchasing data, favorite data, attention data, download data, shared data, communication data, and the like of the object on a video platform; user-behavioral data of the target object on information may include but is not limited to: a watching duration, a quantity of watching times, watching integrity, scoring data, commenting data, and the like of the object on each video; user-behavioral data on a communication platform related to the to-be-pushed information may include but is not limited to: posted data, reading data, searching data, and the like of the object on a communication platform such as a video forum; and user-behavioral data of a candidate object related to the target object may include but is not limited to: the foregoing user-behavioral data of a friend related to the object, and the like.

In this embodiment of this application, the second feature information of the target object is directly affected by the user-behavioral data of the target object, and feature information obtained by the user-behavioral data is used to represent some features of the object. For example, the user-preference level of the target object is used to represent the user-preference level of the target object for the to-be-pushed information. For another example, the eigenvector of the target object is used to represent a feature of information to which the object prefers.

It should be noted that the first feature information of the to-be-pushed information is used to reflect an attribute feature of pushed information.

In a specific implementation process, first feature information of each piece of to-be-pushed information may be obtained by establishing an information graph.

Specific descriptions are given below by using an example of an implementation in which the to-be-pushed information is to-be-pushed game information and the to-be-pushed game information is obtained by constructing a game graph. In this case, two steps are included. First, a game graph needs to be established, and then, feature information of each to-be-pushed game can be obtained according to the game graph.

Specifically, when the game graph is established, a large amount of non-structural original data can be obtained by using a method of a combination of basic game description data and external encyclopedia forum data and by crawling a game block of an open forum such as Wikipedia by using a web crawling means, and pre-processing works such as transcoding and tag elimination can be performed on the original data, to obtain pre-processed data.

Then, word segmentation processing is performed on the pre-processed data, a word having a low frequency is eliminated, an initialization dimension vector is provided to the remaining words, and a game text is trained by using a neural network, to obtain a vector representation form of each word. Further, a game attribute word is extracted according to the vector representation forms of the words. Later, the obtained game attribute words are aggregated, and each obtained type represents an attribute of a game.

Finally, a game attribute word matching method may be used to match attribute words of text data to which each game belongs, to obtain a matched words set corresponding to each game. That is, each game can be represented as a multidimensional eigenvector. In this case, in the eigenvector of each game, an eigenvalue corresponding to each dimension can be used to represent a similarity between a game in a dimension and an attribute of the dimension. Therefore, a larger feature value of a game in a dimension indicates a higher similarity between the game and an attribute of the dimension.

By using the foregoing step, a game graph including an eigenvector of each game can be established. Based on this, first feature information of each piece of to-be-pushed information can be obtained according to the established game graph.

S102. Determine user-preference level information according to the second feature information of the target object and the first feature information of the to-be-pushed information.

In this embodiment of this application, after the second feature information of the target object is obtained, the determined user-preference level information is used to represent a similarity between a feature of information that is more favored by the target object and a feature of to-be-pushed information, and is used to represent a user-preference level of the target object for the to-be-pushed information.

Specifically, a higher user-preference level of the target object for the to-be-pushed information indicates a closer relationship between the to-be-pushed information and the feature of the information to which the object is preferred, and indicates a larger possibility that the to-be-pushed information is the information that the object wants to obtain; or a lower obtained user-preference level indicates that the to-be-pushed information is not so close to the feature of the information favored by the target object, and indicates that it is more likely that the to-be-pushed information is not the information that the object wants to obtain.

S103. Screen the to-be-pushed information according to the user-preference level information into target information.

In the process, the obtained target information is used to represent some to-be-pushed information that is more favored by the target object or that the object wants to obtain.

S104. Push the target information to the target object.

The technical solutions of this embodiment of this application have the following beneficial effects:

In this embodiment of this application, the user-behavioral data of the target object is analyzed, the user-behavioral data of the target object is directly from the target object, and the second feature information of the target object obtained according to this can represent the feature of the information that is more favored by the target object. Therefore, based on the relationship between the second feature information of the target object and the to-be-pushed information, target information that is more favored by the target object can be selected accordingly. Compared with an existing information push method, the technical solution provided in this embodiment of this application consider the second feature information of the target object, so that a problem of an information loss in an existing type system can be avoided. In addition, information in which each target object is interested can be pushed to the target object more accordingly, thereby preventing, to some extent, information in which the target object is not interested from being pushed to the target object. Moreover, compared with a manner in the existing technology in which the target information is determined only by analyzing history data of the target object, the technical solution provided in this embodiment of this application is not limited by a history behavior of the target object. Therefore, relatively accurate information can be pushed to any target object, and a coverage range of the information is wider.

Based on the information push method provided in the foregoing embodiment, this embodiment of this application provides a specific implementation for implementing the technical solution of this application.

Figure 2:
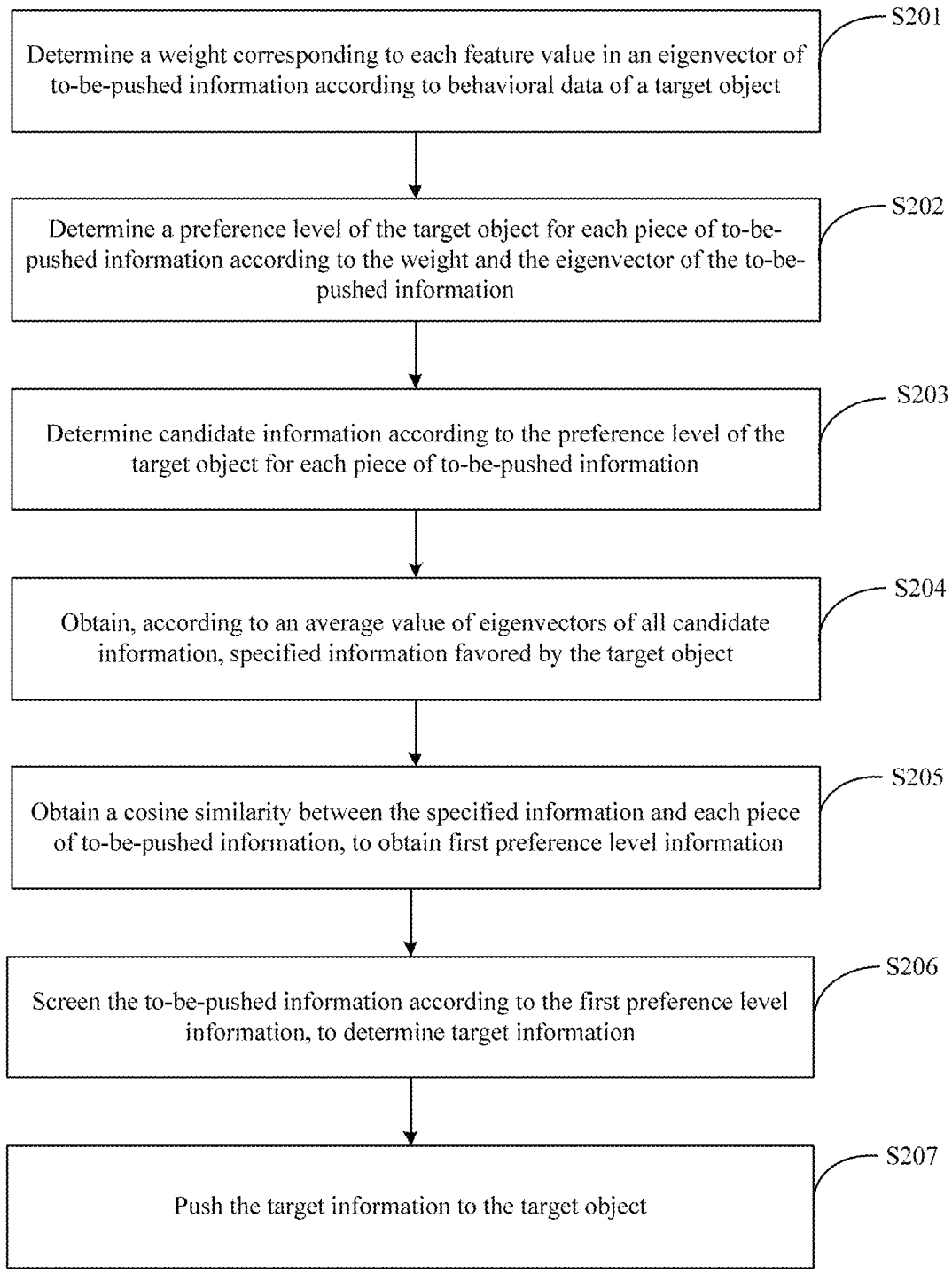
FIG. 2 is a schematic flowchart of another embodiment of an information push method according to an embodiment of this application.

Specifically, FIG. 2 is a schematic flowchart of another embodiment of an information push method according to an embodiment of this application. As shown in FIG. 2, the method includes the following steps:

S201. Determine a weight corresponding to each feature value in an eigenvector of to-be-pushed information according to user-behavioral data of a target object.

Specifically, the eigenvector of the to-be-pushed information may include a plurality of feature values, and each feature value in the eigenvector corresponds to a type of user-behavioral data, so that the plurality of different feature values may be used to describe a behavioral feature of the target object from different dimensions.

S202. Determine a user-preference level of the target object for each piece of to-be-pushed information according to the weight and the eigenvector of the to-be-pushed information.

In this embodiment of this application, the user-preference level is used to represent a user-preference level of the target object for the to-be-pushed information. Specifically, a higher user-preference level of the target object for to-be-pushed information indicates that the target object may more like or more prefer the to-be-pushed information; or a lower user-preference level of the target object for to-be-pushed information indicates that the target object may not need or like the to-be-pushed information.

S203. Determine candidate information according to the user-preference level of the target object for each piece of to-be-pushed information.

S204. Obtain, according to an average value of eigenvectors of all candidate information, specified information favored by the target object.

S205. Obtain a cosine similarity between the specified information and each piece of to-be-pushed information, to obtain first user-preference level information.

S206. Screen the to-be-pushed information according to the first user-preference level information into target information.

S207. Push the target information to the target object.

Specifically, the target object may have a plurality of types of user-behavioral data, eigenvectors can be established according to the user-behavioral data. Each feature value in the eigenvectors corresponds to a type of user-behavioral data, and therefore a behavioral feature of the target object can be described from different dimensions.

Further, in the obtained user-behavioral data of the target object, there are some user-behavioral data of the target object for preferred information, and there are also some user-behavioral data of information that is not so liked by the target object. Based on this, to obtain more accurate second feature information of the target object, the part of to-be-pushed information that is more favored by the target object may be obtained according to a user-preference level of the target object for each piece of to-be-pushed information to be used as candidate information, so that specified information can be determined according to the candidate information more favored by the target object.

Based on this, when a user-preference level of each object is obtained, a weight corresponding to each feature value in the eigenvector of the to-be-pushed information may be determined according to the obtained user-behavioral data of the information that is more favored by the target object, and then weighting calculation is performed on the feature values in the eigenvectors of the to-be-pushed information by using the determined weight, to obtain the user-preference level of the target object for each piece of to-be-pushed information.

In the process of implementing the solution, the candidate information of the to-be-pushed information may further be determined by using a normalized user-preference level. For a method of obtaining the normalized user-preference level, refer to the following formula:

$$\tilde{y}_k = \frac{\sum y_k}{M}$$

$\tilde{y}_k$ representing a normalized user-preference level of the target object to a $k^{th}$ piece of to-be-pushed information, $y_k$ representing a user-preference level of the target object for the $k^{th}$ piece of to-be-pushed information, and M representing a dimension of an eigenvector, that is, representing a quantity of features in the eigenvector.

In this embodiment of this application, the candidate information is to-be-pushed information having a user-preference level meeting a specified condition.

In a specific implementation process, user-preference levels of candidate information can be sorted, and it is determined that to-be-pushed information of a specified quantity and with a higher user-preference level meets the specified condition, to obtain candidate information.

In this embodiment of this application, after the candidate information is determined, the eigenvectors of the candidate information further need to be obtained. The candidate information is information more favored by the target object, and the candidate information can represent the specified information to some extent. Therefore, in an actual implementation process, an average value of feature values in the eigenvectors of the candidate information can be obtained, the average value of the eigenvalues can form an eigenvector having a dimension the same as that of the eigenvector of the candidate information, and an eigenvector including the average value of the eigenvalues is the eigenvector of the specified information favored by the target object. In this way, the specified information favored by the target object is obtained.

In a specific implementation process, for a process of obtaining the first user-preference level information in S205, refer to the following formula:

$$S(k_1) = \frac{\overline{V} \cdot G_k}{|G_k| * |\overline{V}|}$$

$S(k_1)$ representing first user-preference level information of a $k^{th}$ piece of to-be-pushed information, $\overline{V}$ representing an eigenvector of the specified information, $G_k$ representing an eigenvector of the $k^{th}$ piece of to-be-pushed information, and a value range of k varies between 1 and an amount of to-be-pushed information.

It should be noted that a dimension of the eigenvector of the specified information is the same as a dimension of the eigenvector of the to-be-pushed information.

It should be noted that the information push method shown in FIG. 2 is merely a specific implementation of a method shown in an embodiment.

In an actual implementation process, information can be pushed by using the method only. Specifically, after the first user-preference level information of each piece of to-be-pushed information is obtained, when S206 is executed, the to-be-pushed information can be screened by directly using the first user-preference level information.

For example, when the first user-preference level information reaches a preset similarity threshold, it is determined that the to-be-pushed information corresponding to the first user-preference level information is the target information.

Alternatively, information may be pushed by using a combination of the method with another information push manner.

For example, the information push method shown in FIG. 2 is combined with at least one another information push method, and then technical solutions respectively corresponding to the at least two recommendation methods are executed, to obtain respective target information sets. Then, an intersection set in the at least two target information sets is determined and is used as the target information. Further, the target information is pushed to the target object.

Alternatively, for another example, the information push method shown in FIG. 2 is combined with at least one another information recommendation method, and then technical solutions corresponding to the information push methods are sequentially performed. After first target information is obtained according to a first information push method, a technical solution of a second information push method is executed based on the first target information, and so on, to obtain final target information. Then, the finally obtained target information is pushed to the target object.

Alternatively, for another example, weighting calculation may further be performed by combining the information push method shown in FIG. 2 with at least one another information recommendation method, to obtain a final result of the weighting calculation, and the to-be-pushed information is screened according to the final result of the weighting calculation, to determine the target information and push the target information to the target object.

In a specific implementation process, for a method of obtaining a final similarity by using the first user-preference level information, the second user-preference level information, and the third user-preference level information at the same time, refer to the following formula:

$$S(k)=w_1 S(k_1) w_2 S(k_2) w_3 S(k_3))$$

$S(k)$ representing final user-preference level information of a $k^{th}$ piece of to-be-pushed information, $S(k_1)$ representing first user-preference level information of the $k^{th}$ piece of to-be-pushed information, $w_1$ representing a weight of the first user-preference level information, $S(k_2)$ representing second user-preference level information of the $k^{th}$ piece of to-be-pushed information, $w_2$ representing a weight of the second user-preference level information, $S(k_3)$ representing third user-preference level information of the $k^{th}$ piece of to-be-pushed information, and $w_3$ representing a weight of the third user-preference level information.

When the weighting calculation in the foregoing formula is implemented, initial values of weights corresponding to the user-preference level information may be set according to an empirical value. Then, a weighted value that is obtained by performing traffic division experiments for a plurality of times and that is closer to a preferred result of a to-be-processed object is used as a final weight.

The technical solutions of this embodiment of this application have the following beneficial effects:

In this embodiment of this application, the user-behavioral data of the target object is analyzed, the user-behavioral data of the target object is directly from the target object, and the second feature information of the target object obtained according to this can represent the feature of the information that is more favored by the target object. Therefore, based on the relationship between the second feature information of the target object and the to-be-pushed information, target information that is more favored by the target object can be selected accordingly. Compared with an existing information push method, the technical solution provided in this embodiment of this application consider the second feature information of the target object, so that a problem of an information loss in an existing type system can be avoided. In addition, information in which each target object is interested can be pushed to the target object more accordingly, thereby preventing, to some extent, information in which the target object is not interested from being pushed to the target object. Moreover, compared with a manner in the existing technology in which the target information is determined only by analyzing history data of the target object, the technical solution provided in this embodiment of this application is not limited by a history behavior of the target object. Therefore, relatively accurate information can be pushed to any target object, and a coverage range of the information is wider.

Based on the information push method provided in the foregoing embodiment, this embodiment of this application provides another specific implementation for implementing the technical solution of this application.

Figure 3:
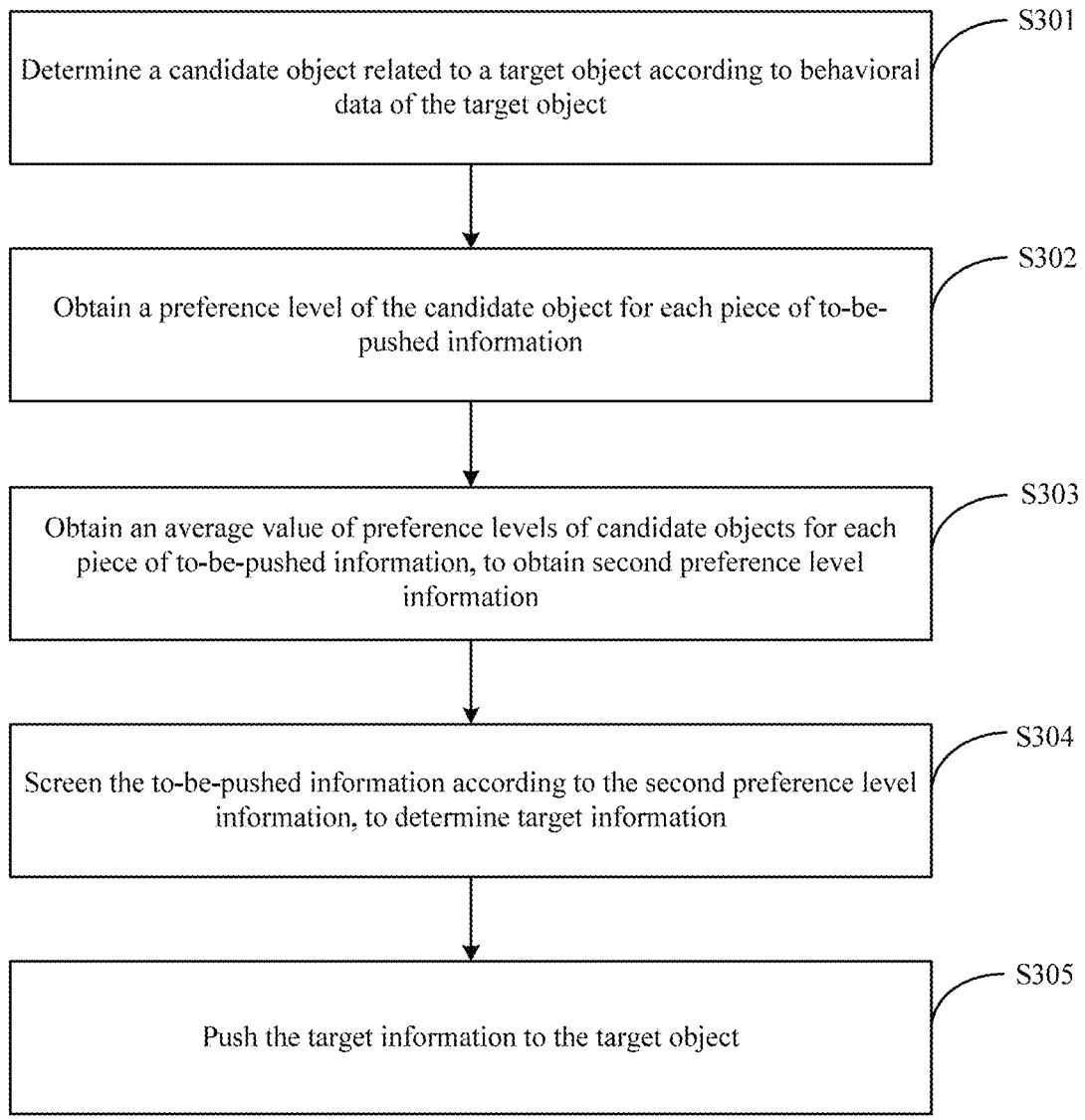
FIG. 3 is a schematic flowchart of still another embodiment of an information push method according to an embodiment of this application.

Specifically, FIG. 3 is a schematic flowchart of still another embodiment of an information push method according to an embodiment of this application. As shown in FIG. 3, the method includes the following steps:

S301. Determine a candidate object related to a target object according to user-behavioral data of the target object.

In this embodiment of this application, candidate objects are some objects related to the target object, and user-behavioral data of the candidate objects can indirectly reflect second feature information of the target object to some extent.

S302. Obtain a user-preference level of the candidate object for each piece of to-be-pushed information.

S303. Obtain an average value of user-preference levels of candidate objects for each piece of to-be-pushed information, to obtain second user-preference level information.

S304. Screen the to-be-pushed information according to the second user-preference level information into target information.

S305. Push the target information to the target object.

In this embodiment of this application, there is a relatively small amount of user-behavioral data of the target object. For example, when some new users have not performed operations on information provided by a service provider, there is a relatively small amount of user-behavioral data of the new users. In view of this, information can be pushed by using the information push method shown in FIG. 3.

Specifically, the candidate objects related to the target object can be preset according to an actual need. For example, a friend of the target object can be obtained as the candidate object. Alternatively, for another example, an object whose feature information is close to the second feature information of the target object can be obtained according to the second feature information of the target object to be used as the candidate object.

In this embodiment of this application, a method for obtaining the user-preference level of the candidate object for each piece of to-be-pushed information is similar to that of the foregoing embodiment. This is not described herein again.

Further, in this embodiment of this application, the candidate object is directly related to the target object, and a user-preference level of the candidate object to each piece of candidate information can reflect a user-preference level of the target object for the candidate information to some extent. Based on this, in this embodiment of this application, an average value the user-preference levels of the candidate objects for each piece of candidate information is obtained as the second user-preference level information.

In a specific implementation process, for a process of obtaining the second user-preference level information in S303, refer to the following formula:

$$S(k_2) = \frac{\sum \tilde{y}_k}{N}$$

$S(k_2)$ representing second user-preference level information of a $k^{th}$ piece of to-be-pushed information, $\tilde{y}_k$ representing a normalized user-preference level of the target object for the $k^{th}$ piece of to-be-pushed information, and N representing a quantity of candidate objects.

It should be noted that the information push method shown in FIG. 3 is merely a specific implementation of a method shown in an embodiment. In an actual implementation process, information can be pushed by using the method only. Alternatively, information may be pushed by using a combination of the method with another information push manner. This is not described in detail herein.

The technical solutions of this embodiment of this application have the following beneficial effects:

In this embodiment of this application, the user-behavioral data of the target object is analyzed, the user-behavioral data of the target object is directly from the target object, and the second feature information of the target object obtained according to this can represent the feature of the information that is more favored by the target object. Therefore, based on the relationship between the second feature information of the target object and the to-be-pushed information, target information that is more favored by the target object can be selected accordingly. Compared with an existing information push method, the technical solution provided in this embodiment of this application consider the second feature information of the target object, so that a problem of an information loss in an existing type system can be avoided. In addition, information in which each target object is interested can be pushed to the target object more accordingly, thereby preventing, to some extent, information in which the target object is not interested from being pushed to the target object. Moreover, compared with a manner in the existing technology in which the target information is determined only by analyzing history data of the target object, the technical solution provided in this embodiment of this application is not limited by a history behavior of the target object. Therefore, relatively accurate information can be pushed to any target object, and a coverage range of the information is wider.

Based on the information push method provided in the foregoing embodiment, this embodiment of this application provides a third specific implementation for implementing the technical solution of this application.

Figure 4:
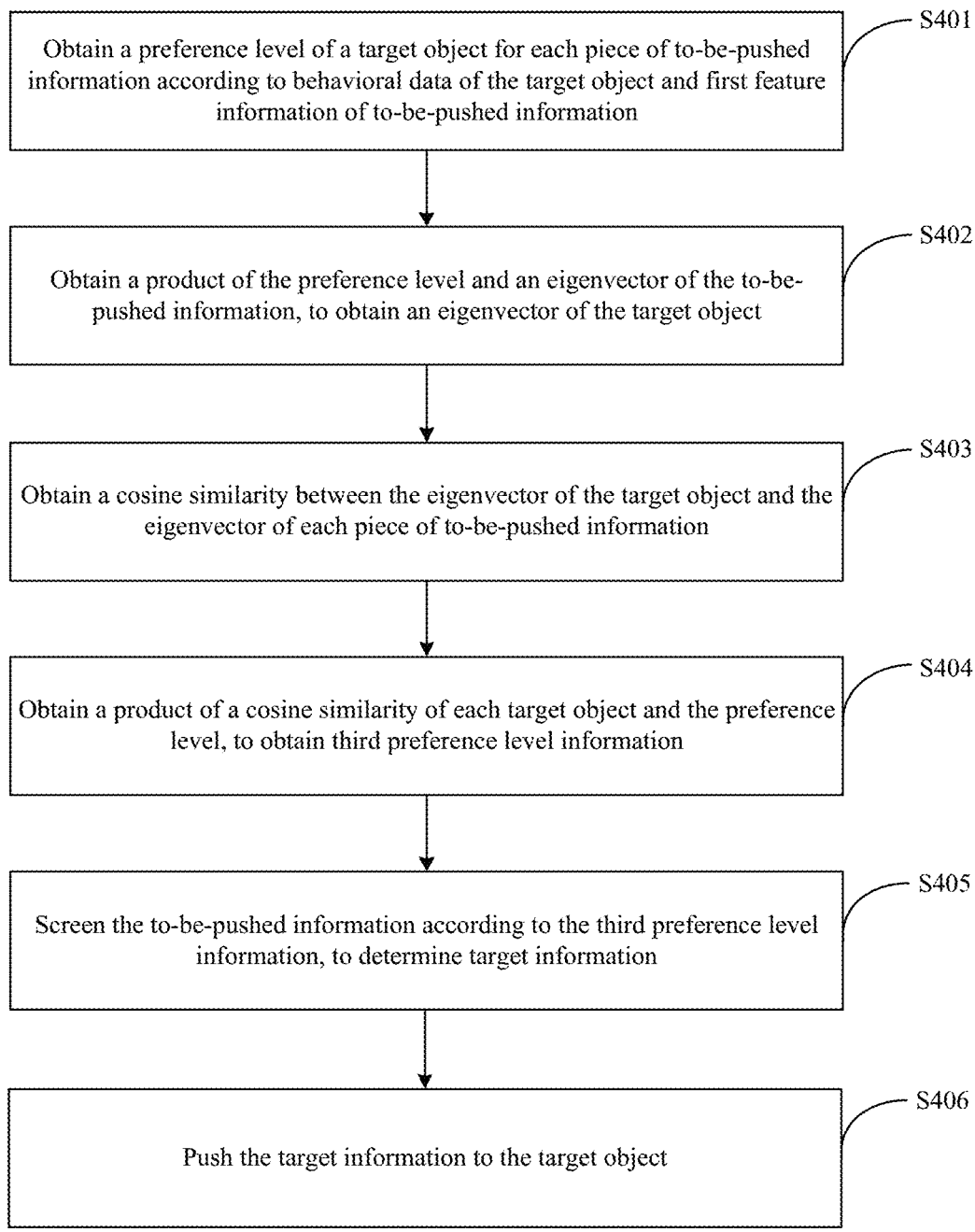
FIG. 4 is a schematic flowchart of yet another embodiment of an information push method according to an embodiment of this application.

Specifically, FIG. 4 is a schematic flowchart of yet another embodiment of an information push method according to an embodiment of this application. As shown in FIG. 4, the method includes the following steps:

S401. Obtain a user-preference level of a target object for each piece of to-be-pushed information according to user-behavioral data of the target object and first feature information of to-be-pushed information.

S402. Obtain a product of the user-preference level and an eigenvector of the to-be-pushed information, to obtain an eigenvector of the target object.

S403. Obtain a cosine similarity between the eigenvector of the target object and the eigenvector of each piece of to-be-pushed information.

S404. Obtain a product of a cosine similarity of each target object and the user-preference level, to obtain third user-preference level information.

S405. Screen the to-be-pushed information according to the third user-preference level information into target information.

S406. Push the target information to the target object.

Specifically, for an implementation of obtaining the user-preference level of the target object for each piece of to-be-pushed information in S401, refer to another embodiment. This is not described herein.

In this embodiment of this application, a user-preference level of the target object for the to-be-pushed information can be initially determined according to the user-behavioral data of the target object, to further use the user-preference level as a correction factor to correct the eigenvector of the to-be-pushed information, so that a preference feature of the object to such a type of information can be obtained. Based on this, for an implementation of obtaining the eigenvector of the target object in S402, refer to the following formula:

$$U = \Sigma \tilde{y}_k \cdot G_k$$

U representing the eigenvector of the target object, $\tilde{y}_k$ representing a normalized user-preference level of the target object for $k^{th}$ piece of to-be-pushed information, and $G_k$ representing an eigenvector of the $k^{th}$ piece of to-be-pushed information.

Based on the foregoing formula, in this embodiment of this application, a dimension of the eigenvector U of the target object is the same as a dimension of the eigenvector $G_k$ of the to-be-pushed information.

It may be understood that, because user-preference levels of the target object for the to-be-pushed information are different, for different to-be-pushed information, different eigenvectors of the object can be obtained.

Further, for specific to-be-pushed information, an eigenvector of a target object corresponding to the to-be-pushed information is an eigenvector that is corrected by using a user-preference level and that is of information more favored by the target object. Based on this, third user-preference level information can be obtained by obtaining a cosine similarity between the eigenvector of the target object and the to-be-pushed information.

In a specific implementation process, for a process of obtaining the third user-preference level information in S404, refer to the following formula:

$$S(k_3) = \frac{U \cdot G_k}{|G_k| * |U|} \tilde{y}_k$$

$S(k_3)$ representing third user-preference level information of a $k^{th}$ piece of to-be-pushed information, $\tilde{y}_k$ representing a normalized user-preference level of the target object for the $k^{th}$ piece of to-be-pushed information, $G_k$ representing an eigenvector of the $k^{th}$ piece of to-be-pushed information, and U representing an eigenvector of the target object.

It should be noted that the information push method shown in FIG. 4 is merely a specific implementation of a method shown in an embodiment. In an actual implementation process, information can be pushed by using the method only. Alternatively, information may be pushed by using a combination of the method with another information push manner. This is not described in detail herein.

The technical solutions of this embodiment of this application have the following beneficial effects:

In this embodiment of this application, the user-behavioral data of the target object is analyzed, the user-behavioral data of the target object is directly from the target object, and the second feature information of the target object obtained according to this can represent the feature of the information that is more favored by the target object. Therefore, based on the relationship between the second feature information of the target object and the to-be-pushed information, target information that is more favored by the target object can be selected accordingly. Compared with an existing information push method, the technical solution provided in this embodiment of this application consider the second feature information of the target object, so that a problem of an information loss in an existing type system can be avoided. In addition, information in which each target object is interested can be pushed to the target object more accordingly, thereby preventing, to some extent, information in which the target object is not interested from being pushed to the target object. Moreover, compared with a manner in the existing technology in which the target information is determined only by analyzing history data of the target object, the technical solution provided in this embodiment of this application is not limited by a history behavior of the target object. Therefore, relatively accurate information can be pushed to any target object, and a coverage range of the information is wider.

Embodiment 5

Based on the information push method provided in the foregoing embodiment, an embodiment of this application further provides an apparatus embodiment used to implement the steps in the foregoing method embodiment and the method.

Figure 5:
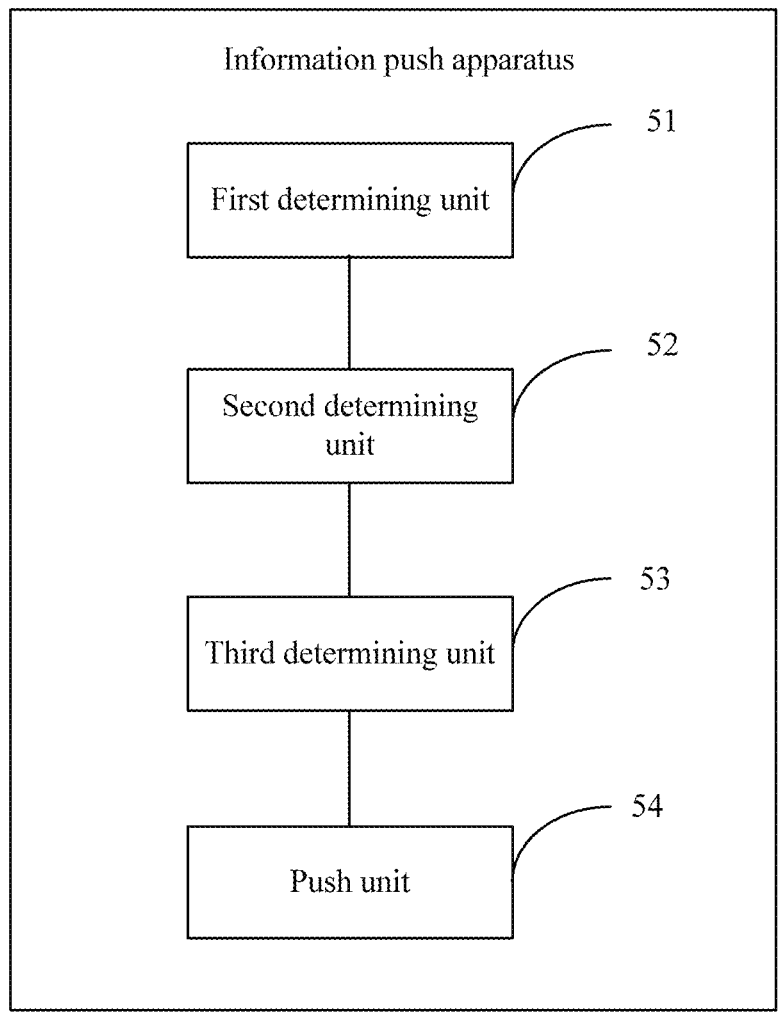
FIG. 5 is a functional block diagram of an information push apparatus according to an embodiment of this application.

FIG. 5 is a functional block diagram of an information push apparatus (e.g., a server) according to an embodiment of this application. As shown in FIG. 5, the apparatus includes:

a first determining unit 51, configured to determine second feature information of a target object associated with a terminal that is communicatively connected to the server according to user-behavioral data of the target object and first feature information of to-be-pushed information;

a second determining unit 52, configured to determine user-preference level information according to the second feature information of the target object and the first feature information of the to-be-pushed information;

a third determining unit 53, configured to screen the to-be-pushed information according to the user-preference level information into target information; and a push unit 54, configured to push the target information to the target object.

In a specific implementation process, the first determining unit 51 is specifically configured to:

determine a weight corresponding to each feature value in an eigenvector of the to-be-pushed information according to the user-behavioral data of the target object; and determine a user-preference level of the target object for each piece of to-be-pushed information according to the weight and the eigenvector of the to-be-pushed information.

In this case, the second determining unit 52 is specifically configured to:

determine candidate information according to the user-preference level of the target object for each piece of to-be-pushed information, the candidate information being to-be-pushed information having a user-preference level meeting a specified condition;

obtain an average value of eigenvectors of all candidate information, to obtain specified information favored by the target object; and obtain a cosine similarity between the specified information and each piece of to-be-pushed information, to obtain first user-preference level information.

In another specific implementation process, the first determining unit 51 is specifically configured to:

determine a candidate object related to the target object according to the user-behavioral data of the target object; and obtain a user-preference level of the candidate object for each piece of to-be-pushed information.

In this case, the second determining unit 52 is specifically configured to:

obtain an average value of user-preference levels of candidate objects for each piece of to-be-pushed information, to obtain second user-preference level information.

In still another specific implementation process, the first determining unit 51 is specifically configured to:

obtain a user-preference level of the target object for each piece of to-be-pushed information according to the user-behavioral data of the target object and the first feature information of the to-be-pushed information; and obtain a product of the user-preference level and an eigenvector of the to-be-pushed information, to obtain an eigenvector of the target object.

In this case, the second determining unit 52 is specifically configured to:

obtain a cosine similarity between the eigenvector of the target object and the eigenvector of each piece of to-be-pushed information; and obtain a product of a cosine similarity of each target object and the user-preference level, to obtain third user-preference level information.

Based on this, an embodiment of this application further provides an information push readable medium, including a computer-executable instruction, and when the computer-executable instruction is run, the following steps are performed:

determining second feature information of a target object according to user-behavioral data of the target object and first feature information of to-be-pushed information;

determining user-preference level information according to the second feature information of the target object and the first feature information of the to-be-pushed information;

ordering the to-be-pushed information according to the user-preference level information into target information; and pushing the target information to the target object.

Figure 6:
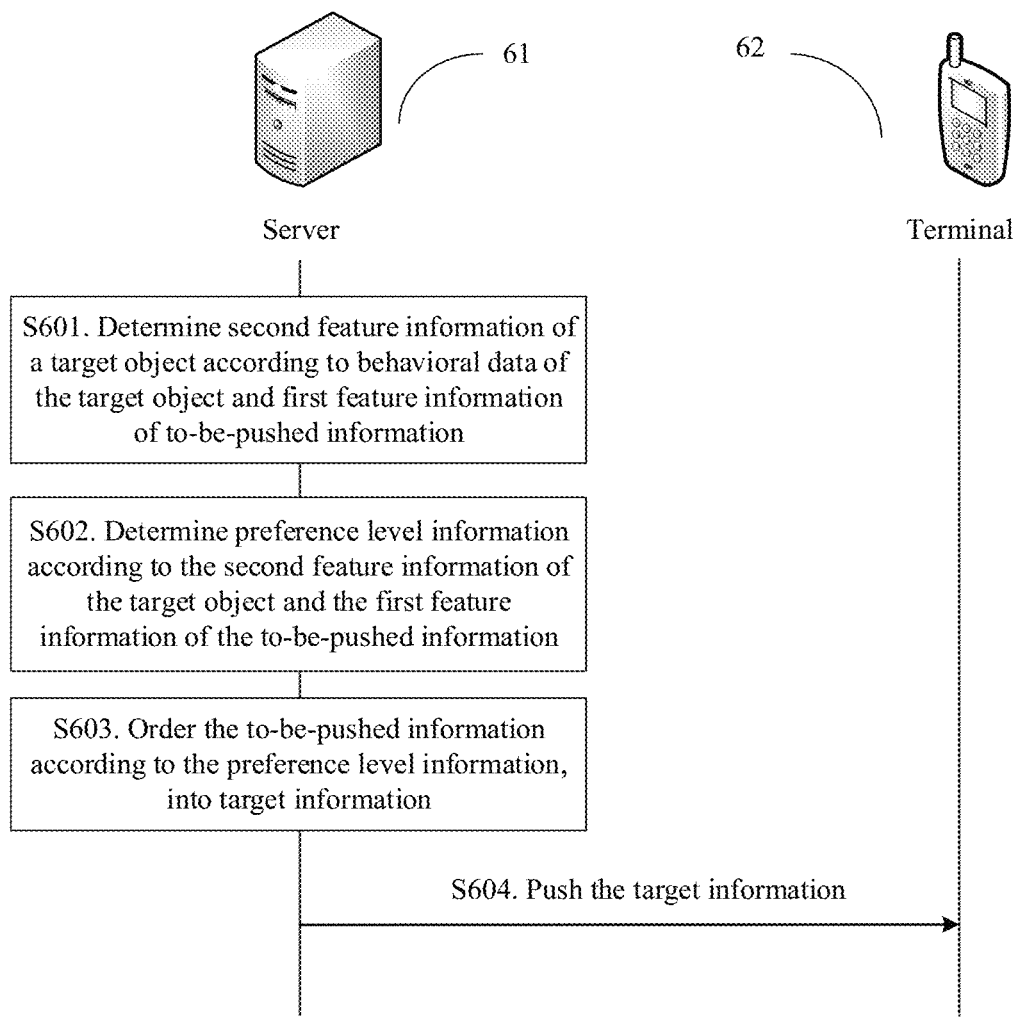
FIG. 6 is a schematic architectural diagram of a system according to an embodiment of this application.

FIG. 6 is a schematic architectural diagram of a system according to an embodiment of this application. As shown in FIG. 6, a server 61 may: determine second feature information of a target object associated with a terminal that is communicatively connected to the server according to user-behavioral data of the target object and first feature information of to-be-pushed information (S601); determine user-preference level information according to the second feature information of the target object and the first feature information of the to-be-pushed information (S602); screen the to-be-pushed information according to the user-preference level information into target information (S603); and push the determined target information to a terminal 62 (S604). Specifically, the information push apparatus provided in this embodiment of this application is disposed on the server side, and the terminal side is a terminal of the target object.

Because the units in this embodiment can perform the method shown in FIG. 1, for a part that is not described in this embodiment in detail, reference may be made to related description of FIG. 1.

The technical solutions of this embodiment of this application have the following beneficial effects:

In this embodiment of this application, the user-behavioral data of the target object is analyzed, the user-behavioral data of the target object is directly from the target object, and the second feature information of the target object obtained according to this can represent the feature of the information that is more favored by the target object. Therefore, based on the relationship between the second feature information of the target object and the to-be-pushed information, target information that is more favored by the target object can be selected accordingly. Compared with an existing information push method, the technical solution provided in this embodiment of this application consider the second feature information of the target object, so that a problem of an information loss in an existing type system can be avoided. In addition, information in which each target object is interested can be pushed to the target object more accordingly, thereby preventing, to some extent, information in which the target object is not interested from being pushed to the target object. Moreover, compared with a manner in the existing technology in which the target information is determined only by analyzing history data of the target object, the technical solution provided in this embodiment of this application is not limited by a history behavior of the target object. Therefore, relatively accurate information can be pushed to any target object, and a coverage range of the information is wider.

It may be clearly understood by a person skilled in the art that for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer apparatus (which may be a personal computer, a server, or a network apparatus) or a processor to perform some steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. An information push method performed at a computing device having one or more processors and memory storing a plurality of programs to be executed by the one or more processors, the method comprising:

determining, at the computing device, first feature information of to-be-pushed information, wherein the to-be-pushed information is game information relating to a computer game, the to-be-pushed game information is obtained by constructing a game graph including using a web-crawling means and word segmentation processing;

determining, at the computing device, second feature information of a target user associated with a terminal that is communicatively connected to the computing device according to user-behavioral data of the target user and the first feature information of to-be-pushed information includes:

determining a weight corresponding to each eigenvalue in an eigenvectorof the to-be-pushed information according to the user-behavioral data of the target user; and determining a user-preference level of the target user for each piece of to-be-pushed information according to the weight and the eigenvectorof the to-be-pushed information, the user-behavioral data of the target user comprises one or more of: a game duration, a game level, a consumption amount, a winning rate, or a quantity of running times;

determining, at the computing device, user-preference level information according to the second feature information of the target user and the first feature information of the to-be-pushed information includes:

determining candidate information according to the user-preference level of the target user for each piece of to-be-pushed information, the candidate information being to-be-pushed information having a user-preference level meeting a specified condition;

obtaining an average value of eigenvectors of all candidate information, to obtain specified information favored by the target user; and obtaining a cosine similarity between the specified information and each piece of to-be-pushed information, to obtain first user-preference level information;

ordering the to-be-pushed information according to the user-preference level information into target information; and pushing the target information to the target user at the terminal.

2. The method according to claim 1, wherein the determining second feature information of a target user according to user-behavioral data of the target user and first feature information of to-be-pushed information comprises:

determining a candidate user related to the target user according to the user-behavioral data of the target user; and obtaining a user-preference level of the candidate user for each piece of to-be-pushed information.

3. The method according to claim 2, wherein the determining user-preference level information according to the second feature information of the target user and the first feature information of the to-be-pushed information comprises:

obtaining an average value of user-preference levels of candidate users for each piece of to-be-pushed information, to obtain second user-preference level information.

4. The method according to claim 1, wherein the determining second feature information of a target user according to user-behavioral data of the target user and first feature information of to-be-pushed information further comprises:

obtaining a user-preference level of the target user for each piece of to-be-pushed information according to the user-behavioral data of the target user and the first feature information of the to-be-pushed information; and obtaining a product of the user-preference level and an eigenvector of the to-be-pushed information, to obtain an eigenvector of the target user.

5. The method according to claim 4, wherein the determining user-preference level information according to the second feature information of the target user and the first feature information of the to-be-pushed information comprises:

obtaining a cosine similarity between the eigenvector of the target user and the eigenvector of each piece of to-be-pushed information; and obtaining a product of a cosine similarity of each target user and the user-preference level, to obtain third user-preference level information.

6. A computing device, comprising:
one or more processors;
a storage apparatus coupled to the one or more processors; and
one or more programs in the storage apparatus, wherein the one or more programs, when executed by the one or more processors, cause the computing device to perform a plurality of operations including:

determining, at the computing device, first feature information of to-be-pushed information, wherein the to-be-pushed information is game information relating to a computer game, the to-be-pushed game information is obtained by constructing a game graph including using a web-crawling means and word segmentation processing;

determining, at the computing device, second feature information of a target user associated with a terminal that is communicatively connected to the computing device according to user-behavioral data of the target user and the first feature information of to-be-pushed information includes:

determining a weight corresponding to each eigenvalue in an eigenvector of the to-be-pushed information according to the user-behavioral data of the target user; and determining a user-preference level of the target user for each piece of to-be-pushed information according to the weight and the eigenvector of the to-be-pushed information;

determining, at the computing device, user-preference level information according to the second feature information of the target user and the first feature information of the to-be-pushed information includes:

determining candidate information according to the user-preference level of the target user for each piece of to-be-pushed information, the candidate information being to-be-pushed information having a user-preference level meeting a specified condition;

obtaining an average value of eigenvectors of all candidate information, to obtain specified information favored by the target user; and obtaining a cosine similarity between the specified information and each piece of to-be-pushed information, to obtain first user-preference level information, the user-behavioral data of the target user comprises one or more of: a game duration, a game level, a consumption amount, a winning rate, or a quantity of running times;

ordering the to-be-pushed information according to the user-preference level information into target information; and pushing the target information to the target user at the terminal.

7. The computing device according to claim 6, wherein the determining second feature information of a target user according to user-behavioral data of the target user and first feature information of to-be-pushed information comprises:

determining a candidate object related to the target user according to the user-behavioral data of the target user; and obtaining a user-preference level of the candidate user for each piece of to-be-pushed information.

8. The computing device according to claim 7, wherein the determining user-preference level information according to the second feature information of the target user and the first feature information of the to-be-pushed information comprises:

obtaining an average value of user-preference levels of candidate users for each piece of to-be-pushed information, to obtain second user-preference level information.

9. The computing device according to claim 6, wherein the determining second feature information of a target user according to user-behavioral data of the target user and first feature information of to-be-pushed information further comprises:

obtaining a user-preference level of the target user for each piece of to-be-pushed information according to the user-behavioral data of the target user and the first feature information of the to-be-pushed information; and obtaining a product of the user-preference level and an eigenvector of the to-be-pushed information, to obtain an eigenvector of the target user.

10. The computing device according to claim 9, wherein the determining user-preference level information according to the second feature information of the target user and the first feature information of the to-be-pushed information comprises:

obtaining a cosine similarity between the eigenvector of the target user and the eigenvector of each piece of to-be-pushed information; and obtaining a product of a cosine similarity of each target user and the user-preference level, to obtain third user-preference level information.

11. A non-transitory computer readable storage medium storing a plurality of machine readable instructions in connection with a server having one or more processors, wherein the plurality of machine readable instructions, when executed by the one or more processors, cause the server to perform a plurality of operations including:

determining, at the computing device, first feature information of to-be-pushed information, wherein the to-be-pushed information is game information relating to a computer game, the to-be-pushed game information is obtained by constructing a game graph including using a web-crawling means and word segmentation processing;

determining, at the computing device, second feature information of a target user associated with a terminal that is communicatively connected to the computing device according to user-behavioral data of the target user and the first feature information of to-be-pushed information includes:

determining a weight corresponding to each eigenvalue in an eigenvector of the to-be-pushed information according to the user-behavioral data of the target user; and determining a user-preference level of the target user for each piece of to-be-pushed information according to the weight and the eigenvector of the to-be-pushed information, the user-behavioral data of the target user comprises one or more of: a game duration, a game level, a consumption amount, a winning rate, or a quantity of running times;

determining, at the computing device, user-preference level information according to the second feature information of the target user and the first feature information of the to-be-pushed information includes:

determining candidate information according to the user-preference level of the target user for each piece of to-be-pushed information, the candidate information being to-be-pushed information having a user-preference level meeting a specified condition;

obtaining an average value of eigenvectors of all candidate information, to obtain specified information favored by the target user; and obtaining a cosine similarity between the specified information and each piece of to-be-pushed information, to obtain first user-preference level information;

ordering the to-be-pushed information according to the user-preference level information into target information; and pushing the target information to the target user at the terminal.

12. The non-transitory computer readable storage medium according to claim 11, wherein the determining second feature information of a target user according to user-behavioral data of the target user and first feature information of to-be-pushed information comprises:

determining a candidate user related to the target user according to the user-behavioral data of the target user; and obtaining a user-preference level of the candidate user for each piece of to-be-pushed information.

13. The non-transitory computer readable storage medium according to claim 12, wherein the determining user-preference level information according to the second feature information of the target user and the first feature information of the to-be-pushed information comprises:

obtaining an average value of user-preference levels of candidate users for each piece of to-be-pushed information, to obtain second user-preference level information.

14. The non-transitory computer readable storage medium according to claim 11, wherein the determining second feature information of a target user according to user-behavioral data of the target user and first feature information of to-be-pushed information further comprises:

obtaining a user-preference level of the target user for each piece of to-be-pushed information according to the user-behavioral data of the target user and the first feature information of the to-be-pushed information; and obtaining a product of the user-preference level and an eigenvector of the to-be-pushed information, to obtain an eigenvector of the target user.

\* \* \* \* \*